United States Patent
Harris et al.

(10) Patent No.: US 6,251,485 B1
(45) Date of Patent: Jun. 26, 2001

(54) FAST-SETTING LATEX COATINGS AND FORMULATIONS

(75) Inventors: John K. Harris; Donald L. Schmidt; Gene D. Rose, all of Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/421,662

(22) Filed: Oct. 20, 1999

Related U.S. Application Data

(62) Division of application No. 08/862,274, filed on May 23, 1997, now Pat. No. 5,997,952.

(51) Int. Cl.$^7$ ............................................. B05D 3/00
(52) U.S. Cl. ..................................... 427/385.5; 427/407.1
(58) Field of Search ............................... 427/407.1, 385.5

(56) References Cited

U.S. PATENT DOCUMENTS

| | | | |
|---|---|---|---|
| 3,947,396 | 3/1976 | Kangas et al. | 260/29.3 |
| 4,544,697 | 10/1985 | Pickelman et al. | 524/458 |
| 4,544,723 | 10/1985 | Upson et al. | 524/347 |
| 4,582,663 | 4/1986 | Pickelmann et al. | 264/517 |
| 4,622,360 | 11/1986 | Gomi et al. | 527/507 |
| 4,704,324 | 11/1987 | Davis et al. | 428/308.4 |
| 4,859,384 | 8/1989 | Fibiger et al. | 264/45.1 |
| 4,929,666 | 5/1990 | Schmidt et al. | 524/516 |
| 5,310,581 | 5/1994 | Schmidt et al. | 427/558 |
| 5,527,853 | 6/1996 | Landy et al. | 524/521 |

FOREIGN PATENT DOCUMENTS

000426 * 1/1979 (EP) .

OTHER PUBLICATIONS

Daniels, E. S., et al., Progress in Organic Coatings, vol. 19, pp. 359–378 (1991).
Kötz, J., et al., Acta Polymer, vol. 43, pp. 193–198 (1992).
Ooka, M., et al., Progress in Organic Coatings, vol. 23, pp. 325–338 (1994).
Padget, J. C., Journal of Coatings Technology, vol. 66, No. 839, pp. 89–105 (1994).
Shalbayeva, G. B., et al., Polymer Science U.S.S.R., vol. 26, No. 6, pp. 1421–1427 (1984).

* cited by examiner

Primary Examiner—Erma Cameron
(74) Attorney, Agent, or Firm—Reid S. Willis

(57) ABSTRACT

A fast-setting coating material can be prepared by contacting a stable aqueous dispersion of a polymer that contains strong cationic groups and weak acid groups onto a substrate that is basic or rendered to be basic. Alternatively, the coating material can be prepared by contacting in either order or concurrently the surface of a substrate with two separate polymers, one of which contains strong cationic groups, and the other of which contains weak acid groups. In this case, the substrate need not be basic for the coating to quickly set.

6 Claims, No Drawings

FAST-SETTING LATEX COATINGS AND FORMULATIONS

CROSS-REFERENCE TO RELATED APPLICATION

This invention is a divisional of application U.S. Ser. No. 08/862,274 filed May 23, 1997, now U.S. Pat. No. 5997952.

BACKGROUND OF THE INVENTION

The present invention relates to a stable aqueous dispersion that forms a water-resistant fast-setting coating when applied to a suitable substrate.

Coating are generally used to provide a protective barrier for applications such as floors, automobiles, exteriors and interiors of honses, as well as painted roads. Protective coatings for floors, for example, have been known since the mid 1950s. Many of the early coating materials were applied using petroleum- or naphthene-based solvents, and as such were undesirable due to the toxicity and flammability of these solvents.

Water-based synthetic emulsion compositions such as styrene resin emulsions, styrene-acrylate copolymer resin emulsions, and acrylate emulsions, developed in the early 1960s, gradually replaced organic solvent-based compositions. Although the water-based compositions are preferable to organic solvent-based compositions for safety and environmental reasons, coatings prepared from water-based compositions require long drying times. During drying, the coatings are susceptible to a number of events that may produce a defective coating, such as drips, sags and runs. Moreover, until the coating is set, it is vulnerable to contamination by dust or water contact, which may also lead to a marred coating. These effects can be minimized by the use of volatile cosolvents which accelerate the drying process, but the cosolvents reintroduce environmental problems that the water-based systems were designed to address.

In addition to the environmental concerns, one of the challenges that remains is to develop latexes that coalesce at room temperature, without leaving a tacky surface.

In view of the deficiencies in the art, it would be desirable to provide a coating that rapidly becomes resistant to marring, defects, and contamination during drying, using a stable aqueous dispersion that does not require environmentally unacceptable cosolvents or crosslinking curatives.

SUMMARY OF THE INVENTION

The present invention addresses a need in the art by providing a way to prepare coatings that set quickly upon contact with a substrate. Accordingly, in one aspect, the present invention is a coated material comprising a substrate having a surface and a coating thereupon, wherein the coating is prepared by any of the steps of:

a) contacting the surface of the substrate with a stable aqueous dispersion that contains a polymer having pendant strong cationic groups and pendant weak acid groups; or b) contacting the surface of the substrate with a stable aqueous dispersion containing a first polymer having pendant strong cationic groups, and a stable aqueous dispersion of a second polymer having pendant weak acid groups, the contact of the polymers with the surface being made in any order or concurrently;

with the proviso that when the coating is prepared by the method of (a), the surface of the substrate is, or is treated to be, sufficiently basic so that the stable aqueous dispersion sets in less time than the time required for a latex that only has pendant strong cation groups or pendant weak acid groups to set.

In a second aspect, the present invention is a method of preparing a fast-setting coating on a substrate having a surface comprising either of the steps of:

a) contacting the surface of a substrate with a stable aqueous dispersion that contains a polymer having pendant strong cationic groups, and pendant weak acid groups; or b) contacting the surface of the substrate with a stable aqueous dispersion that contains a first polymer having strong cationic groups, and a stable aqueous dispersion that contains a second polymer having weak acid groups, the contact of the polymers with the surface being made in any order or concurrently; with the proviso that when the fast-setting coating is prepared by the method of (a), the surface of the substrate is, or is treated to be, sufficiently basic so that the stable aqueous dispersion sets in less time than the time required for a latex that only contains pendant strong cation groups or pendant weak acid groups to set.

In a third aspect, the present invention is a stable aqueous dispersion comprising a polymer having strong cationic groups, weak acid groups, and structural units formed from the polymerization of a non-interfering monomer, wherein the ratio of structural units formed from the polymerization of the non-interfering polymerizable monomer to strong cationic groups and the weak acid groups is from about 70:30 to about 99:1, with the proviso that the strong cationic groups are associated with non-alkaline counterions.

DETAILED DESCRIPTION OF THE INVENTION

The fast-setting coated material of the present invention can be prepared by contacting a substrate with a stable aqueous dispersion that contains a polymer having structural units formed from the polymerization of: a) a polymerizable strong cationic monomer, and b) a polymerizable weak acid monomer. In this aspect of the present invention, the substrate is, or is treated to be, sufficiently basic that the stable aqueous dispersion sets in a time that is less than the time required for a latex that only contains pendant strong cation groups or pendant weak acid groups to set.

The term "sufficiently basic" refers to sufficiency of amount of base as well as base strength. A coating "sets" or is "dry-to-the-touch" when it has formed a skin with sufficient mechanical integrity such that no portion of the skin is removed when it is touched lightly with a finger, and no portion is washed off the substrate when rinsed under a light stream of water.

As used herein, the term "polymerizable strong cationic monomer" refers to a monomer that contains ethylenic unsaturation and a cationic group having a charge that is independent of pH. Similarly, the term "polymenizable weak acid monomer" refers to a monomer that contains ethylenic unsaturation and an acid group having a $pK_a$ in the range of about 2 to about 10. The term "structural units formed from the polymerization of . . ." is illustrated by the following example:

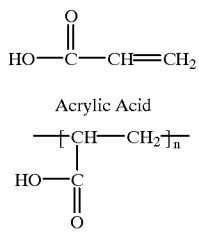

Acrylic Acid

Units formed from the polymerization of Acrylic Acid

In addition to structural units formed from the polymerization of a polymerizable strong cationic monomer and a polymerizable weak acid monomer, the polymer also preferably includes structural units formed from the polymerization of a polymerizable non-interfering monomer. The term "polymerizable non-interfering monomer" is used herein to refer to a monomer that does not adversely affect the fast-setting nature of a coating prepared from the stable aqueous dispersion of the polymer.

Polymerizable weak acid monomers that are suitable for the preparation of stable aqueous dispersion used to prepare the water-resistant fast-setting coating include ethylenically unsaturated compounds having carboxylic acid, phenolic, thiophenolic, or phosphinyl functionality. Preferred polymerizable weak acid monomers include acrylic acid, methacrylic acid, itaconic acid, β-carboxyethyl acrylate (usually as a mixture of acrylic acid oligomers), vinylbenzoic acid, and 2-propenoic acid: 2-methyl-, (hydroxyphosphinyl) methyl ester. Acrylic acid and methacrylic acid are more preferred weak acid monomers.

The polymerizable strong cationic monomer is associated with a non-alkaline counterion, which may be, for example, halide such as chloride, bromide, or iodide, as well as nitrate or sulfate. As used herein, the term "non-alkaline counterion" refers to a counterion that does not cause sufficient ionization of the weak acid to render the stable aqueous dispersion unstable. Thus, a bicarbonate counterion would not be appropriate if a carboxylic acid were the weak acid, since this counterion would, in sufficient quantity, raise the pH of the stable aqueous dispersion to an unstable level. For example, for a stable aqueous dispersion containing 2.3 mole percent each of a quaternary ammonium salt and a carboxylic acid, the presence of a sufficient amount of a bicarbonate counterion to raise the pH of the latex to above 5.5 would cause the dispersion to become unstable.

Suitable polymerizable strono cationic monomers include salts of ethylenically unsaturated compounds having quaternary ammonium, sulfonium, cyclic sulfoniumn and phosphonium functionality. Examples of suitable monomers having quaternary ammonium functionality include ethylenically unsaturated trialkylammonium salts such as vinylbenzyl tri-$C_1$–$C_4$-alkylammonium chloride or bromide; trialkylammoniumalkyl acrylates or methacrylates such as 2-[(methacryloyioxy)ethyl]-trimethylammonium chloride and N,N-diethyl-N-methyl-2-[(1-oxo-2-propenyl)oxy] ethanaminium methyl sulfate (Chem. Abstracts Reg. No. 45076-54-8); and trialkylammoniumalkyl acrylamides such as N,N,N-trimethyl-3-[(2-methyl-1-oxo-2-propenyl)amino]-1-propanaminium chloride (Chem. Abstracts Reg. No. 51441-64-6) and N,N-dimethyl-N-[3-[(2-methyl-1-oxo-2-propenyl)amino]propyl]-benzenemethaminium chloride (Chem. Abstracts Reg. No. 122988-32-3). A preferred polymerizable quaternary ammonium salt is 2-[(methacryloyloxy)ethyl]trimethylammonium chloride.

Examples of polymerizable unsaturated sulfonium salts include dialkylsulfonium salts such as [4-ethoxy-3-(ethoxycarbonyl)-2-methylene-4-oxobutyl] dimethylsulfonium bromide (Chem. Abstracts Reg. No. 63810-34-4); and vinylbenzyl dialkylsulfonium salts such as vinylbenzyl dimethylsulfonium chloride. Examples of polymerizable cyclic sulfonium salts include 1-[4-[(ethenylphenyl)methoxy]phenyl]tetrahydro-2H-thiopyranium chloride (Chem. Abstracts Reg. No. 93926-67-1): and vinylbenzyl tetrahydrothio-phenonium chloride, which can be prepared by the reaction of vinylbenzyl chloride with tetrahydrothiophene.

Examples of polymerizable phosphonium salts include 2-methacryloxyethyltri-$C_1$–$C_{20}$-alkyl-, aralkyl-, or arylphosphonium salts such as 2-methacryloxyethyltri-n-octadecylphosphonium halide (Chem. Abstracts Reg. No. 166740-88-1); tri-$C_1$–$C_{18}$-alkyl-, aralkyl-, or arylvinylbenzylphosphonium salts such as trioctyl-3-vinylbenzylphosphonium chloride, trioctyl-4-vinylbenzylphosphonium chloride (Chem. Abstracts Reg. No. 15138-12-4), tributyl-3-vinylbenzylphosphonium chloride, tributyl-4-vinylbenzylphosphonium chloride (Chem. Abstracts Reg. No. 149186-03-8), triphenyl-3-vinylbenzylphosphonium chloride, and triphenyl-4-vinylbenzylphosphonium chloride (Chem. Abstracts Reg. No. 145425-78-1); $C_3$–$C_{18}$-alkenyltrialkyl-, aralkyi-, or aryl-phosphonium salts such as 7-octenyltriphenylphosphonium bromide (Chem. Abstracts Reg. No. 82667-45-6): and tris(hydroxymethyl)(1-hydroxy-2-propenyl)phosphonium salts (Chem. Abstracts Reg. No. 73082-48-1).

An example of a polymerizable monomer that contains both a weak acid group and a strong cationic group is N-(4-carboxy)benzyl-N,N-dimethyl-2-[(2-methyl-1-oxo-2-propenyl)-oxy] ethanaminium chloride.

It is possible to add strong cationic functionality to an already prepared polymer. For example, a polymerizable monomer having a weak acid group can be copolymerized with a polymerizable non-interfering monomer containing an electrophilic group, such as a vinylbenzyl halide or a glycidyl methacrylate, to form a polymer having a weak acid group and an electrophilic group. This polymer can then be post-reacted with a nucleophile such as a tertiary amine or a dialkyl sulfide, which can displace the halide group or oxirane groups and form a benzylonium salt as illustrated:

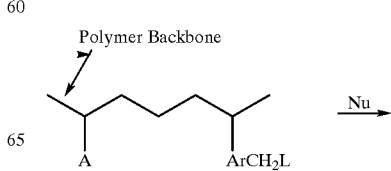

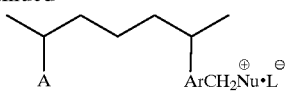

where A is a pendant weak acid group; Ar is an aromatic group, preferably a phenyl group; L is a leaving group, preferably a halide group, more preferably a chloride group; and Nu is preferably a dialkyl sulfide such as dimethyl sulfide and diethyl sulfide, a cyclic sulfide such as tetrahydrothiophene: or a tertiary amine such as trimethyl amine, triethyl amine, tripropyl amine, tributyl amine, and triethanol amine.

In another example of adding strong cationic functionality to an already prepared polymer, a polymer backbone that contains pendant acid groups and a tertiary amine or a sulfide can be post-reacted with a suitable alkylating reagent such as an alkyl halide to form a polymer that contains acid groups and strong cationic groups:

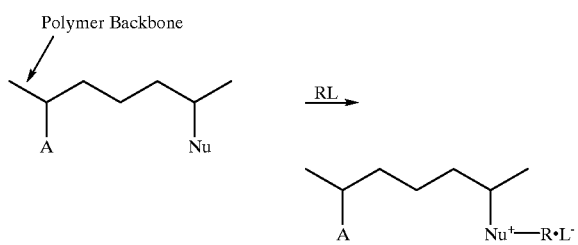

where RL is an alkylating reagent.

Examples of non-interfering polymerizable monomers include acrylates such as methyl acrylate, ethyl acrylate, butyl acrylate, 2-hydroxyethyl acrylate, 2-hydroxypropyl acrylate, glycidyl acrylate, and allyl acrylate, methacrylates such as methyl methacrylate, ethyl methacrylate, butyl methacrylate, allyl methacrylate, glycidyl methacrylate, 2-hydroxyethyl methacrylate, and 2-hydroxypropyl methacrylate; alkenyl aromatic hydrocarbons such as 4-methacryloxy-2-hydroxy-benzophenone, 2-(2'-hydroxy-5-methacrylyloxyethylphenyl)-2H-benzotriazole; and $C_1$–$C_4$ alkyl- or alkenyl-substituted styrenes, preferably styrene, α-methylstyrene, vinyltoluene, and vinylbenzyl chloride. Other examples of non-interfering species include $C_3$–$C_{18}$-perfluoroalkyl methacrylates such as 2-(perfluorooctyl)ethyl methacrylate; $C_3$–$C_{18}$-perfluoroalkyl acrylates such as 2-[ethyl[(heptadecafluorooctyl)-sulfonyl]amino]ethyl 2-propenoate; and $C_3$–$C_{18}$-perfluoro-alkyl vinylbenzenes. (See U.S. Pat. No. 4.929,666, column 4, lines 54 to 68, and column 5, lines 1 to 30.)

The ratio of the pendant weak acid groups to the pendant strong cationic groups is application dependent, but is generally in the range of about 4:1 to about 1:4. The ratio of the structural units formed from the polymerization of the polymerizable non-interfering monomer to the weak acid groups and the strong cationic groups varies depending on the percent solids of the stable aqueous dispersion, but is preferably not less than 70:30, more preferably not less than 80:20, more preferably not less than 90:10, and most preferably not less than 94:6; and preferably not greater than 99.5:0.5, more preferably not greater than 99: 1, and most preferably not greater than about 98:2.

In general, the higher the solids content, the lower the concentration of the total ionic species that is required to form the quick-set coatings. The solids content of the stable aqueous dispersion is application dependent, but preferably not less than 10, more preferably not less than 20, and most preferably not less than 30 weight percent, and preferably not more than 60, more preferably not more than 55, and most preferably not more than 50 weight percent.

The stable aqueous dispersion can be prepared by any suitable means, and is advantageously prepared by the steps of: 1) preparing a seed latex; 2) diluting the seed latex with water; 3) contacting the diluted solution with a radical initiator, a polymerizable non-interfering monomer, a polymerizable weak acid monomer, and a strong cationic monomer; and 4) polymerizing the solution from step 3 under such conditions to form a stable aqueous dispersion having non-interfering groups, pendant strong cationic groups, and pendant weak acid groups.

The seed latex is preferably prepared by emulsion polymerization in a batch process using a cationic surfactant. The seed latex acts as a locus of polymerization for subsequent monomer addition, so that the formation of new particles is minimized and greater uniformity in the distribution of particle size in the final product is achieved. Thus, the monomer or monomers used to prepare the seed latex are chosen to form particles that have an affinity for the monomers subsequently added, so that polymerization occurs preferentially in or on the seed latex particles. The extent to which the seed latex is diluted in step 2 is a function of the desired particle size and the percent solids in the final latex, and can be readily determined by one of ordinary skill in the art.

It is also possible to prepare a stable aqueous dispersion from a preformed polymer. The preformed polymer can be dissolved in a suitable solvent, then dispersed in water by any suitable method. The solvent can then be removed and the solids content adjusted to form a so-called artificial latex.

The stable aqueous dispersion may optionally contain fillers, pigments, dyes, fungicides, bateriacides, thickeners, coalescing aids, and defoamers, that do not cause premature coagulation of the dispersion. Fillers may include clays, silica, ceramics, and other stable aqueous dispersions.

A fast-setting coated material can be prepared when the stable aqueous dispersion that contains the polymer hatting the strong cationic groups, the weak acid groups, and 5 optionally, structural units formed from the polymerization of the polymerizable non-interfering monomer, is contacted with a substrate having a contact surface which is, or is treated to be, sufficiently basic so that the stable aqueous dispersion sets in less than the time required for a latex that only contains pendant strong cation groups or pendant weak acid groups (but not both) to set, preferably within 5 minutes, and more preferably within 3 minutes, and most preferably within 1 minute. The basicity of the substrate required to cause the dispersion to set rapidly depends on the $pK_a$ of the weak acid groups on the polymer. The lower the $pK_a$ of the weak acid, the weaker the base required to cause rapid setting. The stronger the base and the higher the concentration of the base, the faster the setting.

Though not bound by theory, it is believed that the rapid dry-to-the-touch coating is formed by a coacervation process. In this process, the basic substrate acts as a proton sink by extracting protons from the weak acid groups to form the conjugate base, which can then bind irreversibly and rapidly with the strong cationic group to form an irreversible crosslinking network. This crosslinked network is believed to represent the coating after it has set.

In another embodiment of the present invention, fast-setting coatings can be prepared by contacting a substrate with a first stable aqueous dispersion that contains a polymer having structural units formed from the polymerization of a polymerizable strong cationic monomer; and a second stable aqueous dispersion that contains a polymer having structural

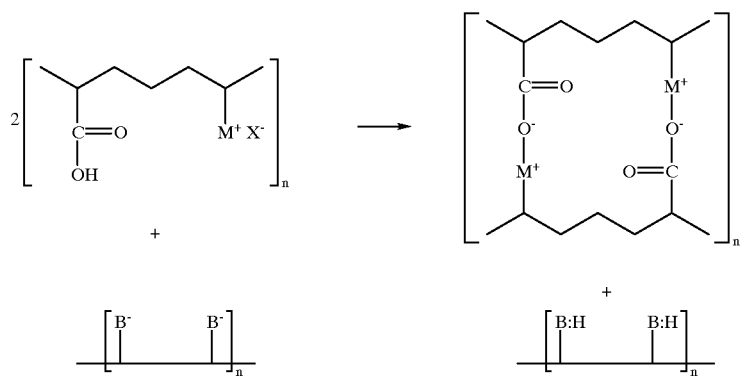

In the above illustration, $B^-$ is a basic moiety that is associated with the substrate. BH, the conjugate acid of $B^-$, preferably has a higher $pK_a$ than the weak acid (which is a carboxylic acid group in the illustration). However, this need not be the case. For example, if there is a sufficient amount of $B^-$ present on the substrate, the conjugate acid BH may actually have a $pK_a$ that is the same as, or lower than, the $pK_a$ of the weak acid. presumably because once the proton is abstracted by $B^-$, the process is irreversible.

An indication of the surface basicity may be provided, for example, by contacting the surface of the substrate with water-wetted pH paper. The pH necessary to induce coacervation will be depend on the $pK_a$ of the weak acid; for a polymer containing pendant carboxylic acid units, for example, the pH of the water in contact with the substrate is not less than 6, more preferably not less than 8, and most preferably not less than 10.

The substrate may be inherently basic. Such substrates include cementations materials such as Portland cement, aluminous cement, inorganic mortar, or cementatious fiber board. The substrate, if not inherently basic, may be treated to be sufficiently basic to cause the coated material to quickly set. For example, the surface of the substrate may be treated with an aqueous solution having a pH that is greater than the $pK_a$ of the weak acid, prior to, or concurrent with, the application of the stable aqueous dispersion of the polymer to the surface of the substrate. Such basic aqueous solutions include, but are not restricted to, alkali metal and alkaline earth metal phosphates, carbonates, bicarbonates, and hydroxides. Preferred substrates that can be treated with base include metal, glass, paper, plastic, cloth, wood, and leather. The substrate may also take a specific shape such as the shape of a hand, for the purposes of forming a latex glove.

The substrate may also include a filler material that renders the surface of the substrate sufficiently basic to cause the stable aqueous dispersion of the polymer to form a fast-setting coating. Lime and calcium carbonate are examples of such filler materials.

units formed from the polymerization of a weak acid monomer, wherein the pH of the first or the second stable aqueous dispersion, or both the first and the second stable aqueous dispersion, is at least about 5. The stable aqueous dispersions may be contacted with the substrate in any order or substantially concurrently, preferably substantially concurrently, and surprisingly, the substrate need not be basic or rendered basic. The second stable aqueous dispersion is preferably stabilized in the presence of an anionic surfactant such as a sulfate, including sodium lauryl sulfate, or DOWFAX EB™ surfactant (obtained by The Dow Chemical Company). The sulfate may also be present as end-groups on the polymer chains resulting from the use of persulfate initiator during the polymerization of the anionic latex. The first and second stable aqueous dispersions are preferably applied to the substrate using a plural component sprayer.

Both the first and the second stable aqueous dispersions preferably have structural units formed from the polymerization of the polymerizable non-interfering monomer. The mole percent of structural units formed from the polymerization of the strong cationic monomer in the first stable aqueous dispersion of the polymer is preferably not less than 0.5, more preferably not less than 1, and most preferably not less than 2 mole percent, and preferably not greater than about 20, more preferably not greater than 10, and most referably not greater than 5 mole percent, based on the total mole percent of strong cationic monomer and non-interfering monomer. The mole percent of structural units formed from the polymerization of the weak acid monomer in the second stable aqueous dispersion of the polymer is also preferably not less than 0.5, more preferably not less than 1, and most preferably not less than 2 mole percent, and preferably not greater than about 20, more preferably not areater than 10, and most preferably not greater than 5 mole percent, based on the total mole percent of strong cationic monomer and non-interfering monomer.

The coated materials of the present invention have wide applicability, including painted concrete roads, where a fast-setting coating can be prepared in the absence of solvents or crosslinking curatives, by merely applying the stable aqueous dispersion of the polymer (or polymers) to the surface of the road. Other uses include primers for stucco houses or cementatious fiber boards. The aqueous dispersions can also be used to coat cured or uncured cement to reduce water evaporation, thereby improving the physical properties of the final concrete. The dispersions can also be used to prepare latex gloves or condoms by dipping a basic form or mold into the stable aqueous dispersion to cause rapid setting of the dispersion on the form.

In the most preferred formulations, the stable aqueous dispersions used to prepared the coated materials have a shelf-stability of at least 6 months, preferably at least one year. The formulations may also contain additives such as pigments, dyes, fungicides, and bacteriacides.

The following examples are for illustrative purposes only and are not intended to limit the scope of this invention.

EXAMPLE 1

Preparation of a Fast-Setting Clear Coating

The stable aqueous dispersion was prepared in a two-step process. First, a cationic surfactant stabilized polystyrene seed latex prepared using a batch process. Next, a portion of the seed latex is used in a continuous addition process to prepare a second, film-forming latex containing a carboxylic acid and a quaternary ammonium functional monomer.

The cationic latex seed was prepared in the following manner. To a 1-liter, 3-neck, glass reaction flask equipped with a nitrogen inlet, a reflux condenser with a nitrogen outlet, and a mechanical stirrer was added styrene (100 g). ARQUAD™ 18–50 octadecyltrimethlammonium chloride surfactant (a trademark of AkzoNobel, 20 g active), hydrogen peroxide (3.3 g. 1.0 g active) water (200 g) and iron sulfate solution (0.25 g in 100 g water). The flask was heated to 70° C. over 2 hours with stirring under nitrogen, after which the stirring was stopped and the heating source removed. The latex seed was allowed to sit overnight in the flask. The result was an opaque, high viscosity dispersion with 35.8 percent solids. The particle size was 407 Å (mean value) and 393 Å (median value).

The film-forrning latex was prepared from the cationic seed latex using a continuous addition polymerization method. Syringe pumps were used as the continuous addition control means. To a 2-liter, 3-neck. glass reaction flask equipped with a nitrogen inlet, a reflux condenser with a nitrogen outlet, and a mechanical stirrer was added water (452.3 g) and the cationic seed latex (8.8 g). The flask was heated to 60° C. and stirred. Table 1 shows the solutions that were prepared for continuous addition.

TABLE 1

| Stream | Component | Amount |
|---|---|---|
| 1 | Butyl Acrylate | 176 g |
|  | Methyl Methacrylate | 124 g |
|  | Methacrylic Acid | 5.3 g |
| 2 | M-Quat[a] | 17.3 g (12.8 g active) |

TABLE 1-continued

| Stream | Component | Amount |
|---|---|---|
| 3 | t-Butylhydroperoxide | 1.8 g (1.3 g active) |
| 4 | Sodium Formaldehyde Sulfoxylate | 0.96 g in 10 ml water |

[a]2-[(methacryloyloxy)ethyl] trimethylammonium chloride obtained as a 74 percent aqueous solution from Bimax Inc., 717 Chesapeake Ave., Baltimore, MD 21225

The components from the four streams were added over the first four hours of polymerization. After completion of addition, polymerization was continued at 60° C. for 0.5 hour. The resulting latex was filtered and found to have a solids content of 37.0 percent. Table 2 shows the composition of the latex.

TABLE 2

| Monomer | Weight percent | Mole percent | Molecular weight g/mol |
|---|---|---|---|
| Butyl Acrylate | 55.3 | 50.2 | 128.1 |
| Methyl Methacrylate | 39.0 | 45.3 | 100.1 |
| Methacrylic Acid | 1.7 | 2.3 | 86.1 |
| M-Quat | 4.0 | 2.3 | 207.7 |

The particle size was 1550 Å (mean) and 1450 Å (median).

A clear, fast-setting coating was prepared by applying a coat of the latex to a cementatious fiber board using a paint brush. The sample was observed at 22.4° C. and 65 percent relative humidity. Thirty seconds after application of the latex, the coated, cementations fiber board was placed under running water. The coating showed no signs of bleeding, running or any detrimental effects. Within twenty minutes of application the latex dried to a clear film.

EXAMPLE 2

Preparation of a Fast-Setting Pigmented Coating

A titanium dioxide pigment slurry is used to prepare a pigmented latex coating to demonstrate that a fast-setting coating can be obtained on an alkaline surface using pigmented coating formulations. The composition of the titanium dioxide pigment slurry is given in Table 3.

TABLE 3

| Component | Amount (weight percent) |
|---|---|
| Water | 31.0 |
| Ti-Pure ™ R-900 Titanium Dioxide[a] | 66.5 |
| RHODAQUAT ™ M242C/26 Cationic Surfactant[b] | 2.20 |
| FOAMASTER ™ V Nonionic Surfactant[c] | 0.30 |

[a](a trademark of E. I. du Pont de Nemours and Company)
[b](a trademark of Rhône-Poulenc)
[c](a trademark of Henkel)

The titanium dioxide pigment slurry was prepared bv mixing the titanium dioxide into the water containing the surfactants under high speed shearing to form a smooth, viscous dispersion. To a glass jar was added 29.4 g of this slurry. then 5.5 g of deionized water. The diluted slurry was mixed to form a uniform suspension. The latex having the composition shown in Table 2 and a total solids content of 37.4 wt % was then mixed with the slurry at about 350 rpm for 3 minutes. The resulting dispersion had the consistency and color of whole milk. A coating of this dispersion was applied with a paint brush onto a cementatious fiber board. After 1 minute the coating on the board was placed under a stream of running water. There was no indication of pigment loss or any detrimental effect to the coating. About 10 mL of the pigmented latex was transferred to a spray bottle pressurized with nitrogen to about 30 psig. A small amount of the pigmented latex was spayed onto a cementations fiber board. A uniform coating of the cementations fiber board was obtained. Again, after about 1 minute, the coated board was placed under a stream of running water. There was no indication of pigment loss or any detrimental effect on the coating.

EXAMPLE 3

Forming a Fast-Setting Coating on Base-Treated Filter Paper

A 9.0-cm circle of Whatman #1 qualitative filter paper was cut into a 5.7 cm×7.0 cm rectangle, then taped to a glass plate along all edges. The paper was soaked with saturated sodium bicarbonate solution, then blotted with paper towels to remove excess fluid. A coating of latex having a composition described in Table 2 was then spread on the coated paper. Rapid setting of the latex film on the paper was apparent in less than 15 seconds. After about 2 minutes the coating was completely dry-to-the-touch. After 3 minutes, a drop of water w as place onto the coated paper and beaded with no visible signs of bleeding. This drop test was repeated several times with the same results.

EXAMPLE 4

Forming a Fast-Setting Coating on Base-Treated Newspaper

An 11-inch×17-inch (28-cm×43-cm) sheet of paper was suspended in a hood and lightly sprayed with a 1.0 percent solids sodium bicarbonate solution, then allowed to dry overnight. The following day, the sample was coated with a thin layer of the latex having a composition described in Table 2. The coating set in less than 10 seconds, it displayed no indications of bleeding into the paper, and it produced a glossy surface.

EXAMPLE 5

Forming a Fast-Setting Coating on Base-Treated Cloth

A swatch of common clothing material (60% cotton, 40% polyester) was dipped into a 1.0 percent by weight solution of sodium bicarbonate and allowed to soak for 5 minutes. The swatch was then removed, squeezed as dry as possible and taped to a glass plate. An 8-mil drawdown bar was then used to spread across the swatch a sample of the latex having a composition described in Table 2. The latex was dry-to-the-touch within 10 seconds. Within 2 minutes, the excess water could be squeezed from the coated material using a high-pressure laminated plastic roller. Within 30 minutes the latex dried to a clear flexible coating with some level of gloss.

EXAMPLE 6

Plural Component Spraying with Alkaline Material

A Binks Mach 1 PCX Plural Component paint sprayer was used to apply a blended stream of a latex having a composition described in Table 2, and a 3.0 percent by weight solution of $K_2HPO_4$ to a sample of oak-laminated plywood. The atomizing pressure was set at about 72 psig and both storage vessels were set at approximately 35 psig. The coating became dry-to-the-touch rapidly (less than 30 seconds). Two aluminum coupons (Q-panel, Inc.) were also coated with similar results. The atomizing pressure was decreased to 45 psig and the storage vessels pressured dropped to 10 psig. The procedure was then repeated. The rate at which the coating became dry-to-the-touch was unaffected, but the surface of the coating was improved. A "Cold Rolled Steel" coupon (Q-panel) was also coated easily using the same operating conditions and obtaining similar results.

EXAMPLE 7

Plural Component Spraying Using an Anionic Latex

The paint sprayer described in Example 6 was used to apply a blended stream of a latex having a composition described in Table 2, and an anionic latex having a composition described in Table 4.

TABLE 4

| Monomer | Weight Percent | Mole Percent |
| --- | --- | --- |
| Butyl Acrylate | 50.5 | 43.9 |
| Methyl Methacrylate | 43.0 | 47.9 |
| Methacrylic Acid | 5.95 | 7.7 |
| Allyl Methacrylate | 0.52 | 0.46 |

The atomizing pressure was set to 40 psig and the storage vessel pressure was set to 7.5 psig. The spray was applied to a glass plate and the resultant coating set in less than 30 seconds.

EXAMPLE 8

Plural Component Spraying with an Anionic Material

The paint sprayer described in Example 6 was used to apply a blended stream of latex, having a composition described in Table 2, and an aqueous anionic corrosion inhibiting solution, consisting of 4.45% by weight of MIRANOL CS® (manufactured by Rhone Poulenc). The atomizing pressure was set at 35 psig and the storage vessel pressure was set at 5 psig. The coating was applied to an untreated aluminum coupon, a pre-treated aluminum coupon (Q-panel, Inc.) and a pre-coated sample of PTO. The spray formed an acceptable coating and set in less than 30 seconds on all three test panels.

EXAMPLE 9

Plural Component Spraying with Cationic Latex and Anionic Latex

The paint sprayer described in Example 6 was used to apply a blended stream of cationic latex, having a composition described in Table 5, and an anionic latex, having a composition as described in Table 4. The atomizing pressure was set at 35 psig and the storage vessel pressures were set at 10 psig. The coating was applied to an untreated glass plate. The spray formed an acceptable coating and coacervated in less than 20 seconds. It set in less than 30 seconds. The plate was placed under running water after 1 minute with no detrimental effect to the coating. Two aluminum coupons, one of which was pre-treated with phosphate (Q-panel, Inc.), were also coated. The spray formed an acceptable coating and coacervated in less than 15 seconds en both test panels.

TABLE 5

| Monomer | Weight Percent | Mole Percent |
|---|---|---|
| Butyl Acrylate | 56.2 | 51.3 |
| Methyl Methacrylate | 39.7 | 46.5 |
| M-Quat | 4.1 | 2.3 |

What is claimed is:

1. A method of preparing a fast-setting coating on a substrate having a surface comprising the steps of contacting the surface of the substrate with a) a first stable aqueous dispersion containing a first polymer having pendant strong cationic groups, and b) a second stable aqueous dispersion of a second polymer having pendant weak acid groups; wherein the contact of the polymers with the surface is made in any order or concurrently, wherein the first and second polymer each have structural units formed from the polymerization of a non-interfering polymerizable monomer and wherein the pH of the first or the second stable aqueous dispersion is at least about 5.

2. The method of claim 1 wherein the first polymer further has pendant weak acid groups and the pH of the second stable aqueous dispersion is at least about 5.

3. The method of claim 1 wherein the weak acid groups are structural units formed from the polymerization of acrylic acid, methacrylic acid, itaconic acid, β-carboxyethyl acrylate, or vinylbenzoic acid, or a combination thereof; and the strong cationic groups are structural units formed from the polymerization of a trialkylaminmoniumalkyl acrylate; a trialkylammoniumalkyl methacrylate, a trialkylammoniumalkyl acrylamide, a dialkylsulfoniumn salt, a benzylsulfonium salt, a cyclic sulfonium salt, a 2-methacryloxyethyltri-$C_1$–$C_{20}$-alkyl-phosphonium salt, a 2-nethacryl-oxyethyltri-$C_1$–$C_{20}$-aralkyl-phosphonium salt, a 2-methacryl-oxyethyltri-$C_1$–$C_{20}$-aryl-phosphonium salt, a tri-$C_1$–$C_{18}$-alkyl-vinylbenzylphosphonium salt, a tri-$C_1$–$C_{18}$-aralkyl-vinylbenzylphosphonium salt, a tri-$C_1$–$C_{18}$-aryl-vinylbenzylphosphonium salt, a $C_3$–$C_{18}$-alkenyltrialkyl-phosphonium salt, a $C_3$–$C_{18}$-aralkyl-phosphonium salt, or a $C_3$–$C_{18}$-aryl-phosphonium salt, or a combination thereof; and the non-interfering polymerizable monomer is an acrylate, a methacrylate, or a styrenic compound, or a combination thereof.

4. The method of claim 3 wherein the weak acid groups are structural units formed from the polymerization of acrylic acid or methacrylic acid, or a combination thereof; the strong cationic groups are structural units formed from the polymerization of an ethylenically unsaturated quaternary ammonium salt; and the non-interfering polymerizable monomer is methyl methacrylate, butyl acrylate, 2-hydroxyethyl methacrylate, 4-methacryloxy-2-hydroxybenzophenone, or 2-(2'-hydroxy-5-methacrylyloxyethylphenyl)-2H-benzotriazole, or a combination thereof.

5. The method of claim 4 wherein the ethylenically unsaturated quaternary ammonium salt is 2-trimethylammonium chloride, and the non-interfering polymerizable monomer is methyl methacrylate or butyl acrylate or a combination thereof.

6. The method of claim 1 wherein the substrate is cured Portland cement, uncured Portland cement, aluminous cement, metal, glass, paper, plastic, cloth, wood, or leather.

* * * * *